US012812566B2

(12) United States Patent
Raghavan et al.

(10) Patent No.: US 12,812,566 B2
(45) Date of Patent: Nov. 24, 2026

(54) EFFECTIVE ISOTROPIC RADIATED POWER LIMIT FOR MULTIPLE BEAM COMMUNICATION

(71) Applicant: QUALCOMM Incorporated, San Diego, CA (US)

(72) Inventors: Vasanthan Raghavan, West Windsor Township, NJ (US); Mustafa Emara, Munich (DE); Marco Papaleo, Bologna (IT); Michael Alexander Ruder, Pommelsbrunn (DE)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 18/477,093

(22) Filed: Sep. 28, 2023

(65) Prior Publication Data

US 2025/0113309 A1 Apr. 3, 2025

(51) Int. Cl.
*H04W 52/36* (2009.01)
*H04W 52/42* (2009.01)

(52) U.S. Cl.
CPC ......... *H04W 52/367* (2013.01); *H04W 52/42* (2013.01)

(58) Field of Classification Search
CPC ............................ H04W 52/367; H04W 52/42
See application file for complete search history.

(56) References Cited

U.S. PATENT DOCUMENTS

2017/0117950 A1* 4/2017 Strong ................... H04B 17/11
2019/0104549 A1* 4/2019 Deng ................... H04B 7/0617
2020/0021349 A1* 1/2020 Chapman ............. H04B 7/0695
2020/0037254 A1* 1/2020 Comsa ................ H04W 52/265
2020/0077411 A1* 3/2020 Raghavan ............ H04B 7/0617
2020/0145079 A1* 5/2020 Marinier .............. H04B 7/0408
2020/0274656 A1* 8/2020 Gordaychik .......... H04L 1/1896
2022/0007207 A1* 1/2022 Raghavan ........... H04W 56/001
2024/0396602 A1* 11/2024 Raghavan ............ H04B 7/0617
2024/0422699 A1* 12/2024 Katz ........................ H04B 1/04

FOREIGN PATENT DOCUMENTS

WO 2020073191 A1 4/2020
WO 2020209769 A1 10/2020

OTHER PUBLICATIONS

International Search Report and Written Opinion—PCT/US2024/041881—ISA/EPO—Jan. 15, 2025.
Partial International Search Report—PCT/US2024/041881—ISA/EPO—Nov. 21, 2024.

* cited by examiner

*Primary Examiner* — Junpeng Chen
(74) *Attorney, Agent, or Firm* — Dinsmore & Shohl LLP

(57) ABSTRACT

Various aspects of the present disclosure generally relate to wireless communication. In some aspects, a network entity may transmit during a first time interval in accordance with a first effective isotropic radiated power (EIRP) limit, wherein the first EIRP limit is associated with a first beamforming vector corresponding to a single peak in a beamspace, and transmitting during a second time interval in accordance with a second EIRP limit lower than the first EIRP limit, wherein the second EIRP limit is for a multiple beam communication condition. Numerous other aspects are described.

10 Claims, 11 Drawing Sheets

EFFECTIVE ISOTROPIC RADIATED POWER LIMIT FOR MULTIPLE BEAM COMMUNICATION

FIELD OF THE DISCLOSURE

Aspects of the present disclosure generally relate to wireless communication and to techniques and apparatuses for effective isotropic radiated power (EIRP) limits for communications using beamforming vectors that have multiple main lobes or peaks in a beam pattern or beamspace.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

Some aspects described herein relate to a method of wireless communication performed by a network entity. The method may include transmitting during a first time interval in accordance with a first effective isotropic radiated power (EIRP) limit, wherein the first EIRP limit is associated with a first beamforming vector corresponding to a single peak in a beamspace, transmitting during a second time interval in accordance with a second EIRP limit lower than the first EIRP limit, where the second EIRP limit is for a multiple beam (multi-beam) communication condition wherein the beamforming vectors have multiple peaks in beamspace.

Some aspects described herein relate to a method of wireless communication performed by an apparatus. The method may include performing an EIRP measurement using a plurality of beamforming vectors, the plurality of beamforming vectors including at least, a set of first beamforming vectors, each beamforming vector of the first set of first beamforming vectors having only one peak in a beamspace, and a set of second beamforming vectors, each beamforming vector of the set of second beamforming vectors having at least two peaks in the beamspace. The method may include providing an EIRP value using the EIRP measurement.

Other aspects provide: an apparatus operable, configured, or otherwise adapted to perform any one or more of the aforementioned methods and/or those described herein with reference to and as illustrated by the drawings; a non-transitory, computer-readable medium comprising computer-executable instructions that, when executed by a processor of an apparatus, cause the apparatus to perform the aforementioned methods and/or those described herein with reference to and as illustrated by the drawings; a computer program product embodied on a computer-readable storage medium comprising code for performing the aforementioned methods and/or those described herein with reference to and as illustrated by the drawings; and/or an apparatus comprising means for performing the aforementioned methods and/or those described herein with reference to and as illustrated by the drawings. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
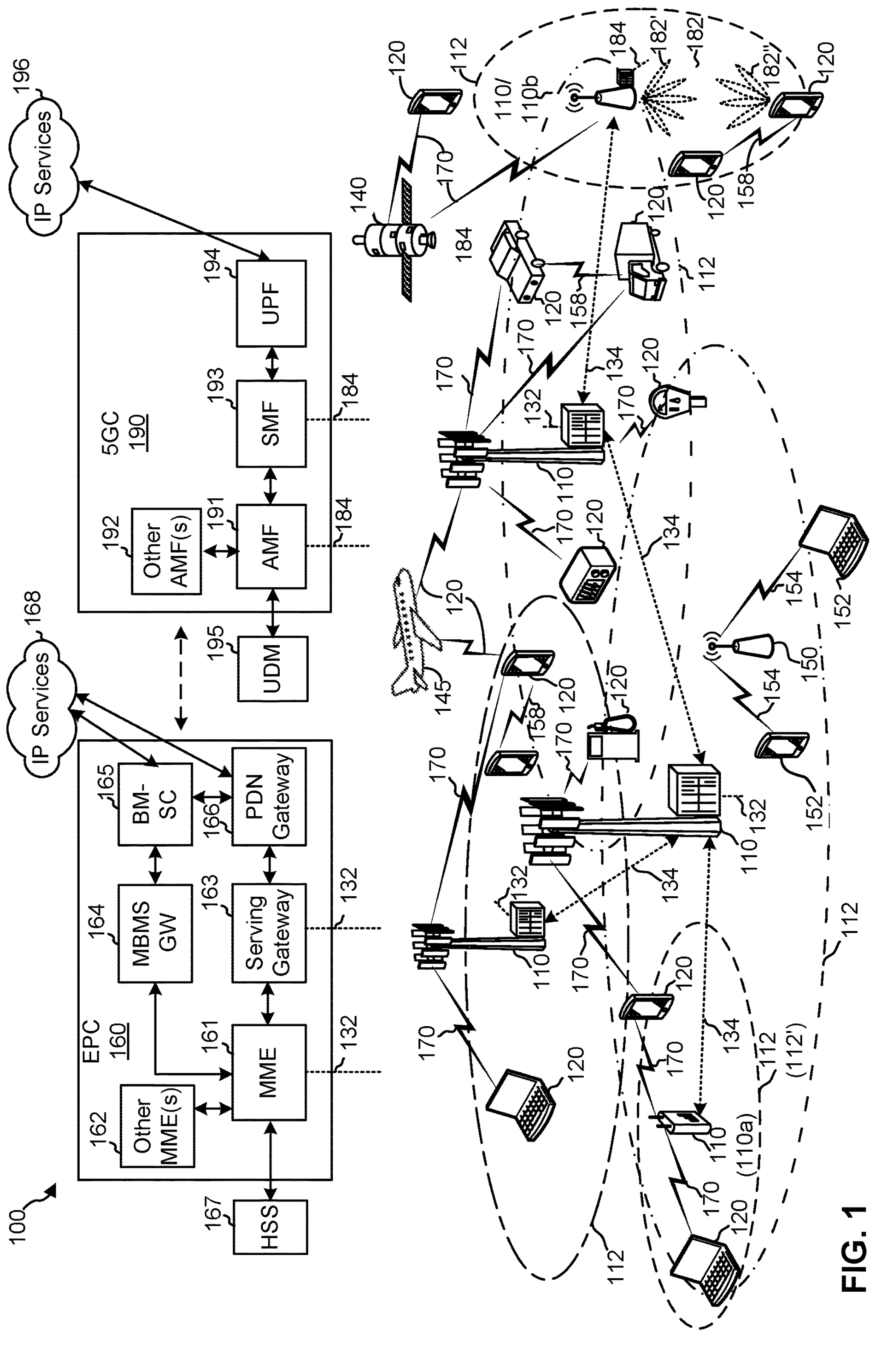
FIG. 1 depicts an example of a wireless communications network, in accordance with the present disclosure.

Aspects of the present disclosure provide apparatuses, methods, processing systems, and computer-readable mediums for providing an effective isotropic radiated power (EIRP) limit for multiple-beam (multi-beam) communication, thereby capturing multi-beam impact in EIRP mask specifications for interference avoidance.

A wireless communication device, such as a radio unit (RU), a transmission reception point (TRP), a gNB, or a user equipment (UE), may communicate using beamforming. At a transmitter, beamforming generally involves transmitting using a spatial parameter, such as a beamforming vector. Beamforming enables increased gain while covering a relatively smaller area than a non-beamformed transmission such as a pseudo-omnidirectional transmission. A beamforming vector may steer energy in a direction defined by an azimuth angle ($\phi$) and an elevation angle ($\theta$), such as a single angle pair of azimuth angle and elevation angle. For example, a beamforming vector may lead to a directional beam with a single energy peak at ($\phi_{SC}$, $\theta_{TL}$). In some examples, a transmitter may transmit signals over a beamforming vector with multiple energy peaks. This may be due to the transmitter using a single beamforming vector with two energy peaks, or transmissions coming from multiple transmitters, each with beamforming vectors having only one energy peak. A beam (or collection of beams) with multiple energy peaks may be referred to herein as a multi-beam. A multi-beam may serve multiple UEs at the same time. For example, a first antenna panel of a transmitter may transmit to a first UE and a second antenna panel of the transmitter may transmit to a second UE.

"Coexistence" may refer to configuring different radio technologies, such as radio access technologies and other radio technologies, to mitigate negative effects on one another from radio transmission. A recent issue in coexistence arises in spectrum designated as the C band or C-band. Specifically, airplane radio altimeters (RAs) may operate in the 4.2-4.4 GHz range and some cellular services may operate up to a frequency of 3.98 GHz in some geographies (e.g., the United States). Leakage of radiation from cellular devices to RAs can lead to safety issues and poor performance of RAs.

Spectrum sharing between terrestrial and satellite services may be implemented, such as for intermediate frequencies (e.g., Frequency Range 3 (FR3), between 7.125 and 24.25 GHz). Similar issues are seen at millimeter wave carrier frequencies that use large antenna arrays (such as antenna arrays exceeding 64 antenna elements at a gNB, a customer premises equipment (CPE), etc.). As the carrier frequency increases, even more antennas can be used in Frequency Range 4 or 5 (FR4/5) at both gNBs and UEs. Further, the density and variety of network nodes (e.g., infra nodes such as repeaters, relays, intelligent reflective surface (IRS) nodes, integrated access and backhaul (IAB) nodes) may increase in more advanced networks, which may be referred to as hyper-densification. Interference generated by these nodes impacting existing services or operations may be problematic. Furthermore, some parties are considering the coexistence of terrestrial and air-to-ground (ATG) networks, in which an ATG base station may serve users in aircraft at altitude ranges of 3-10 km). In these contexts, it may be beneficial to minimize interference from legacy BSs toward the sky.

One way to improve coexistence between wireless communication devices (e.g., gNBs, UEs) and other devices is to specify a limit on the radiated power of a wireless communication device. For example, a regulatory body or a specification may impose a limit on an effective isotropic radiated power (EIRP) of a transmitter. An EIRP is a hypothetical power that would have to be radiated by an isotropic antenna to give the same ("equivalent") signal strength as the actual source antenna in the direction of the antenna's strongest beam. Thus, EIRP is a representation of power density radiated in a direction, such as a direction corresponding to a main lobe (e.g., corresponding to an energy peak) of a beam or a side/secondary/back lobe of the beam. EIRP can also be measured at any point on a sphere around a transmitter, as defined by an azimuth angle and an elevation angle.

An EIRP limit may specify an allowable EIRP of a transmitter. An EIRP limit or a group of EIRP limits over a set of elevation and/or azimuth angles may be referred to as an EIRP mask. For example, an EIRP mask may be defined as an allowable maximum set of EIRP values as a function of elevation angles from a transmitter, such as a terrestrial network node or a gNB. In some examples, the EIRP limit may correspond to a specific elevation angle or elevation angle range, which may be helpful to control terrestrial transmitters' emissions at particular elevation angles (such as above the horizon). For example, a first EIRP limit may be specified at a first elevation angle, a second EIRP limit may be specified at a second elevation angle, and so on. A transmitter's radiated power may be limited to at most the first EIRP limit when measured at the first elevation angle, and to at most the second EIRP limit when measured at the second elevation angle. Thus, spectrum sharing with incumbent services (such as RAs) is improved.

Multi-beam transmission, which may be used in multi-user multiple-input multiple-output (MU-MIMO) communication, may create difficulties relative to single-beam transmission. For example, beamformed transmissions to two UEs from two antenna panels of a gNB may cause a third UE to experience a combined effect of beamformed transmissions to the two UEs. The combined effect of the two beams can lead to an increased side lobe level perceived at the third UE relative to if the gNB transmitted to only one of the two UEs. If the two directional beams from the gNB to the two UEs are well-separated from one another and the antenna array dimension at the third UE exceeds a certain antenna element threshold, then the side lobe seen at the third UE may be the sum of the contributions from the individual beams (from the gNB to each of the two UEs). Otherwise, the two beams can interact with each other and the interference/side lobe level could be more complicated. Multi-beam transmission can also occur in a multiple transmission reception point (multi-TRP) context in which a single UE experiences interference due to multiple TRPs' transmissions (which may be intended for different UEs).

Furthermore, multi-beam transmission may create complexity for implementation of EIRP limits such as EIRP masks. For example, a multi-beam can be generated using a single antenna panel or using multiple antenna panels. The properties of the multi-beam, such as secondary/side/back lobe directions and magnitudes, may be different for a single antenna panel than for multiple antenna panels. These properties may be a function of directions over which a multi-beam's energy is split (e.g., if the directions are within a threshold angular separation, then the side lobes can be significantly enhanced at a chosen direction for interference estimation), how an available total radiated power is split over the multiple panels or over different directions in the single-panel case (e.g., if the total radiated power split is more equitably, side lobes may be enhanced in a given direction for interference estimation), and array dimensions of the antenna panels (e.g., larger array sizes can make the peak directions stronger relative to other directions, leading to spillover in a chosen direction for interference estimation). Thus, as a result of the use of multiple beams, the characteristics of the regulatory EIRP mask may be affected.

For example, consider an EIRP limit at an elevation angle without the notion of multi-beams. That is, the EIRP limit may be used in connection with K discrete Fourier Transform (DFT) beamforming vectors where each beamforming vector steers energy only over a single direction in a beamspace. A beamspace may include a space (e.g., a set of directions, a range of angles such as a range of azimuth angles and/or elevation angles, a window, etc.) in which a set of beamforming vectors generate an energy response. For example, a beamspace may comprise a space including a beam pattern response or gain response corresponding to a group of beamforming vectors of a transmitter. In some aspects, a beamspace may be referred to as a beam pattern. For multi-beam transmission, a given EIRP at the elevation angle may under-represent actual radiated power due to side/rear/secondary lobes of multi-beams. Therefore, a given EIRP limit that is configured in connection with only single beams may lead to an unacceptably high amount of interference or radio leakage. Furthermore, restricting EIRP limits to a level that produces acceptable interference or radio leakage in all possible multi-beam configurations (including a worst-case multi-beam configuration) and/or time instances may decrease available transmit power of network nodes, thereby reducing coverage and throughput. Still further, testing methods for EIRP limits corresponding to single-beam configurations may fail to take into account issues specific to multi-beam communication that may affect the beam pattern generated for multi-beam communications. Thus, using such testing methods may lead to inaccurate characterization of beams in a multi-beam configuration, causing interference and hampering the deployment of multi-beam communications such as MU-MIMO.

Aspects of the present disclosure relate generally to multi-beam communication. Some aspects more specifically relate to EIRP limits for multi-beam communication. In some aspects, a network entity may transmit during a first time interval in accordance with a first EIRP limit and during a second time interval in accordance with a second EIRP limit lower than the first EIRP limit. The first EIRP limit may be associated with a first beamforming vector corresponding to a single peak (e.g., energy peak) in a beamspace. The second EIRP limit may be for a multi-beam communication condition. For example, the second EIRP limit may be associated with a second beamforming vector corresponding to two or more peaks in the beamspace. In some aspects, the first time interval comprises a first percentage (or fraction) of a time window and the second time interval comprises a second percentage (or fraction) of the time window, wherein the first percentage and the second percentage sum to 100 percent. In some aspects, the first EIRP limit may be associated with a first beam direction and the second EIRP limit may be associated with a second set of beam directions (e.g., which may be associated with the two or more peaks).

In some aspects, an apparatus may perform EIRP measurement using a plurality of beamforming vectors, where the plurality of beamforming vectors may include a set of second beamforming vectors that each have at least two peaks in a beamspace. The plurality of beamforming vectors may also include a set of first beamforming vectors that each have only one peak in the beamspace. The apparatus may provide an EIRP value (such as for EIRP limit determination) using the EIRP measurement. In some aspects, the EIRP value may use weighting of the EIRP measurement, such as a weighted average. In some aspects, the EIRP measurement may be according to a configuration that indicates one or more parameters such as a number of antenna panels, an array size of an antenna panel, a steering parameter of an array of the antenna panel, a peak direction of the array, or a power split between two directions of the array.

Aspects of the present disclosure may be used to realize one or more of the following potential advantages. In some aspects, by transmitting during the first time interval in accordance with the first EIRP limit and during the second time interval in accordance with the second EIRP limit lower than the first EIRP limit, total radiated energy may be reduced relative to conforming only to the first EIRP limit (which may be unsuitable for multi-beam communication), thereby reducing interference and radio leakage. Further, these proposed definitions of EIRP limits can be signaled over the air. Furthermore, by transmitting according to the first EIRP limit at some times and the second EIRP limit at other times, total transmit power or energy available to the network entity is increased relative to conforming to only the second EIRP limit, thereby increasing throughput and coverage. By providing a first time interval comprising a first percentage of a time window and a second time interval comprising a second percentage of the time window, a duty cycle can be implemented, enabling prediction of EIRP levels at different times and reducing the impact of multi-beam communication. By associating the first EIRP limit with a first beam direction and the second EIRP limit with a second set of beam directions, the second EIRP can be implemented for side lobe directions and the first EIRP can be implemented for non-side lobe directions.

In some aspects, by performing EIRP measurement using a plurality of beamforming vectors, where the plurality of beamforming vectors may include a set of second beamforming vectors that each have at least two peaks in a beamspace, EIRP testing is enabled for multi-beam communication. For example, this EIRP testing may enable conformance with the first and second EIRP limits described above. By using weighting of the EIRP measurement, such as a weighted average, particular azimuth angles or elevation angles can be weighted differently, providing improved consideration of multi-beam communication issues such as side lobes. By performing the EIRP measurement according to a configuration that indicates one or more parameters, improved consideration of multi-beam communication issues is also provided.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a UE, a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an internet of things (IoT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

A BS 110 may include, for example, a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110*a* may have a coverage area 112' that overlaps the coverage area 112 of a macro cell). A BS 110 may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT) radio access network (RAN) Intelligent Controller (RIC), or a Non-Real Time (Non-RT) RIC, to name a few examples.

Figure 3:
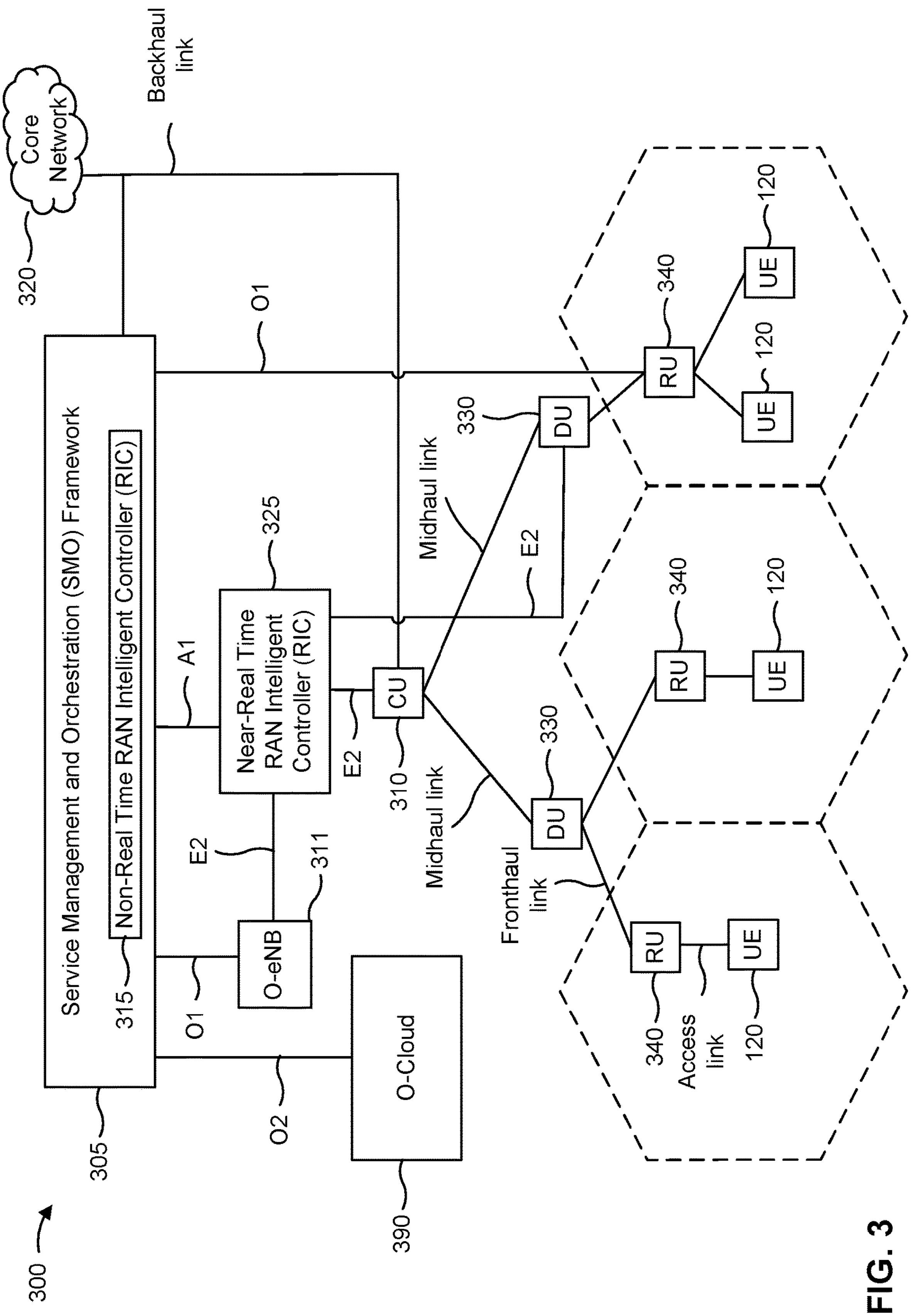
FIG. 3 depicts an example disaggregated base station architecture, in accordance with the present disclosure.

In another example, various aspects of a base station may be virtualized. More generally, a BS (e.g., BS 110) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as having a disaggregated RAN architecture, such as an Open RAN (O-RAN) architecture or a Virtualized RAN (vRAN) architecture. FIG. 3 depicts and describes an example disaggregated BS architecture.

Different BSs 110 within wireless communications network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, the 3rd Generation Partnership Project (3GPP) currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave or near mmWave radio frequency bands (e.g., a mmWave base station such as BS 110*b*) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHz, 20 MHz, 100 MHz, 400 MHz, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110*b* in FIG. 1) may utilize beamforming with a UE 120 to improve path loss and range, as shown at 182. For example, BS 110*b* and the UE 120 may each include a plurality of antennas, such as antenna elements, antenna panels, and/or antenna arrays to facilitate the beamforming. In some cases, BS 110*b* may transmit a beamformed signal to UE 120 in one or more transmit directions 182'. UE 120 may receive the beamformed signal from the BS 110*b* in one or more receive directions 182". UE 120 may also transmit a beamformed signal to the BS 110*b* in one or more transmit directions 182". BS 110*b* may also receive the beamformed signal from UE 120 in one or more receive directions 182'. BS 110*b* and UE 120 may then perform beam training to determine the best receive and transmit directions for each of BS 110*b* and UE 120. Notably, the transmit and receive directions for BS 110*b* may or may not be the same. Similarly, the transmit and receive directions for UE 120 may or may not be the same.

Wireless communications network 100 further includes a Wi-Fi access point 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QoS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, a transmission reception point (TRP), or a combination thereof, to name a few examples.

As indicated above, FIG. 1 is provided as an example. Other examples may differ from what is described with regard to FIG. 1.

Figure 2:
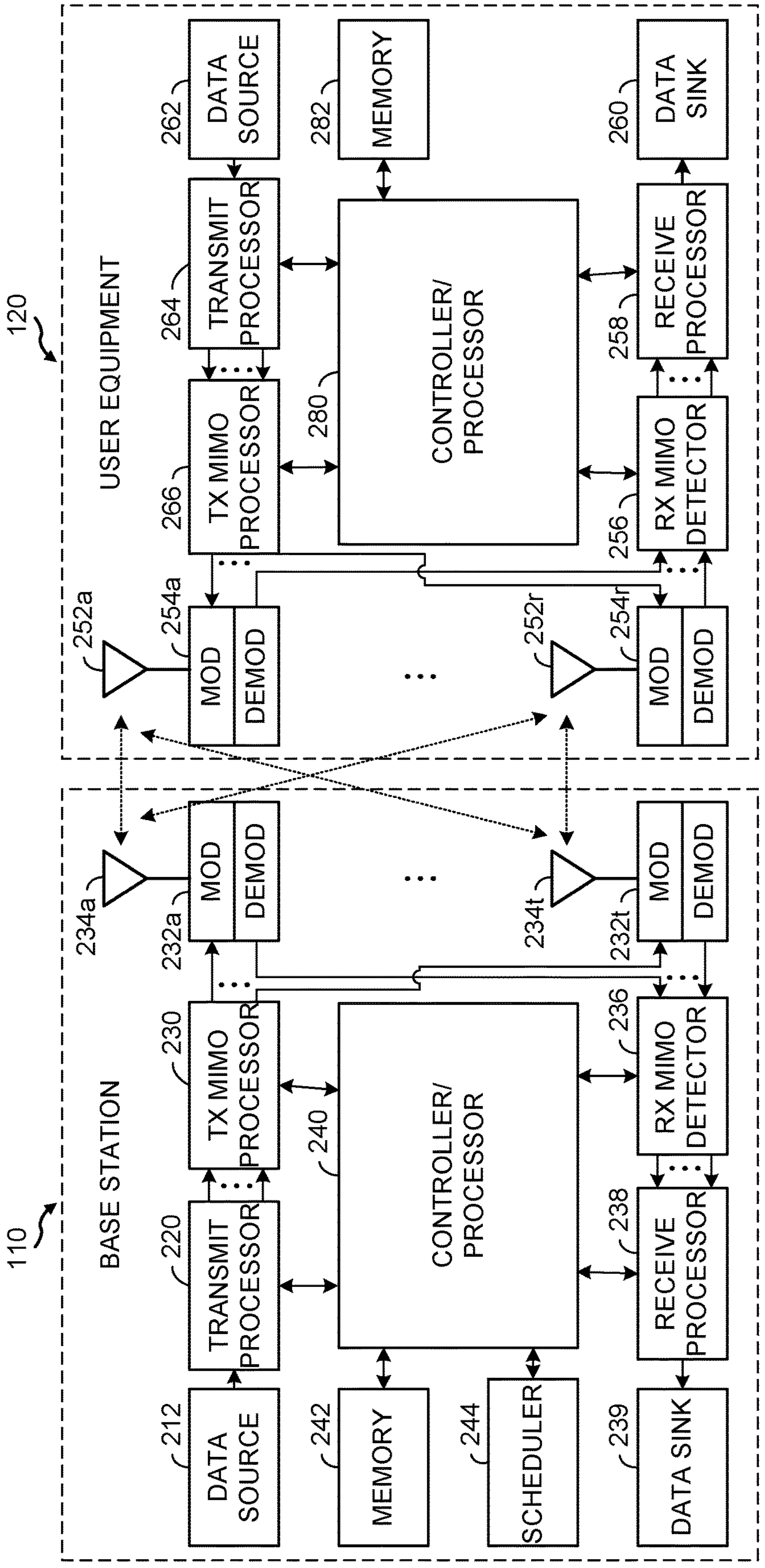
FIG. 2 depicts aspects of an example base station and user equipment, in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, BS 110 includes a transmit processor 220 that may receive data from a data source 212 and control information from a controller/processor 240. The control information may be for the physical broadcast channel (PBCH), the physical control format indicator channel (PCFICH), the physical hybrid automatic repeat request (HARQ) indicator channel (PHICH), the physical downlink control channel (PDCCH), the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), the secondary synchronization signal (SSS), the PBCH demodulation reference signal (DMRS), or the channel state information reference signal (CSI-RS).

Transmit (TX) MIMO processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

UE 120 includes antennas 252*a*-252*r* that may receive the downlink signals from the BS 110 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples to obtain received symbols.

Receive (RX) MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 110.

At BS 110, the uplink signals from UE 120 may be received by antennas 234*a*-234*t*, processed by the demodulators in transceivers 232*a*-232*t*, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232*a-t*, antenna 234*a-t*, and/or other aspects described herein. Similarly, "receiving" may refer to various mechanisms of obtaining data, such as obtaining data from antennas 234*a-t*, transceivers 232*a-t*, RX MIMO detector 236, controller/processor 240, receive processor 238, scheduler 244, memory 242, a network interface, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254*a-t*, antenna 252*a-t*, and/or other aspects described herein. Similarly, "receiving" may refer to various mechanisms of obtaining data, such as obtaining data from antennas 252*a-t*, transceivers 254*a-t*, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data. In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an O-RAN (such as the network configuration sponsored by the O-RAN Alliance), or a vRAN (also known as a cloud RAN (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture, in accordance with the present disclosure. The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figures 4A, 4B, 4C, 4D:
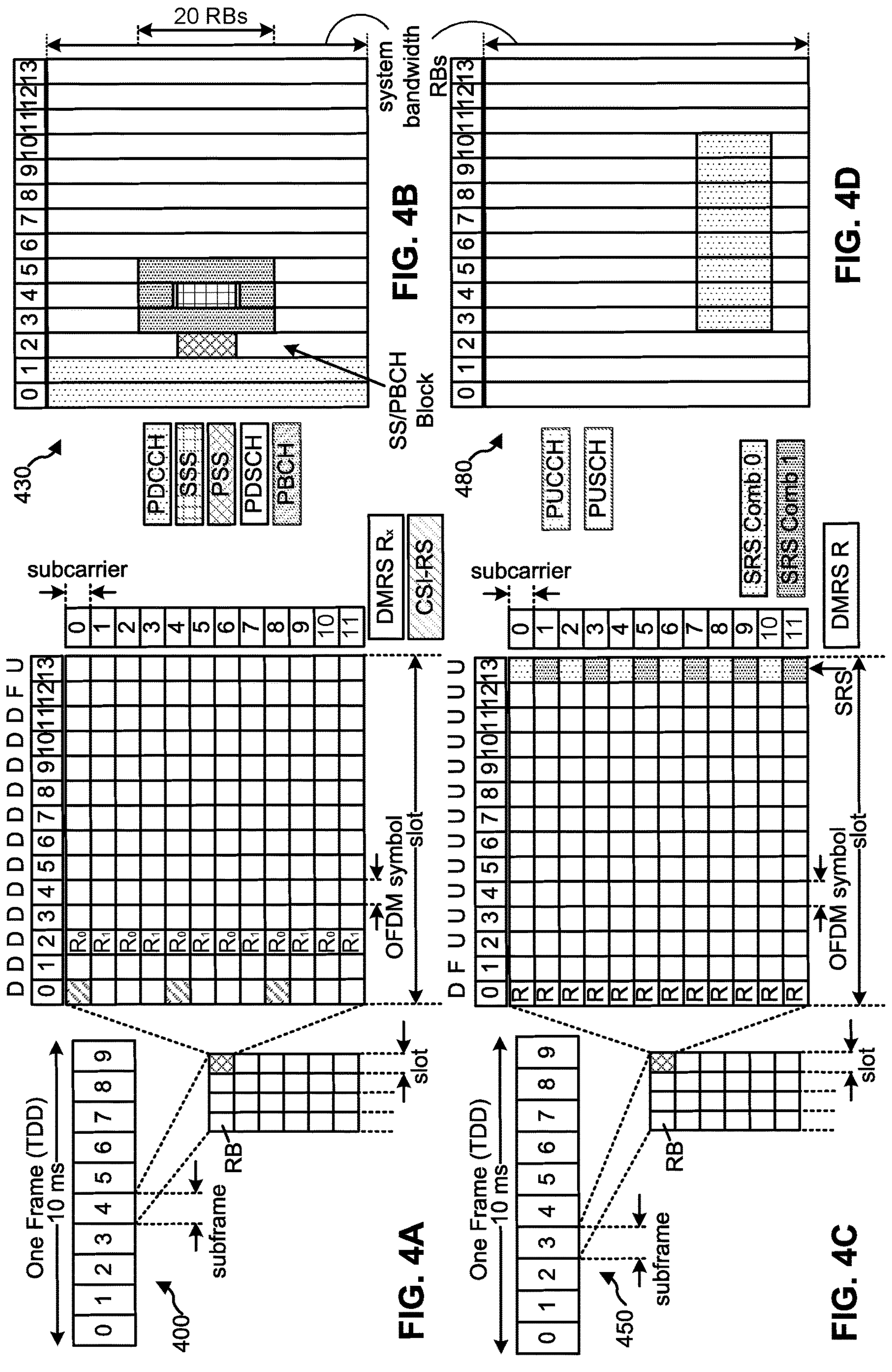
FIGS. 4A, 4B, 4C, and 4D depict aspects of data structures for a wireless communications network, in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing. OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ)

0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^{\mu}$ slots/subframe. The subcarrier spacing and symbol length/duration are a function of the numerology. The subcarrier spacing may be equal to $2^{\mu}\times 15$ kHz, where is the numerology index, which may be selected from values 0 to 5. Accordingly, the numerology μ=0 has a subcarrier spacing of 15 kHz and the numerology μ=5 has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include DMRSs and/or CSI-RSs for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The PDCCH carries DCI within one or more control channel elements (CCEs), each CCE including, for example, nine RE groups (REGs), each REG including, for example, four consecutive REs in an OFDM symbol.

A PSS may be within symbol 2 of particular subframes of a frame. The PSS is used by a UE (e.g., UE 120) to determine subframe/symbol timing and a physical layer identity.

An SSS may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The PBCH, which carries a master information block (MIB), may be logically grouped with the PSS and SSS to form a synchronization signal (SS)/PBCH block (also referred to as an SS block (SSB)). The MIB provides a number of RBs in the system bandwidth and a system frame number (SFN). The PDSCH carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit SRSs. The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
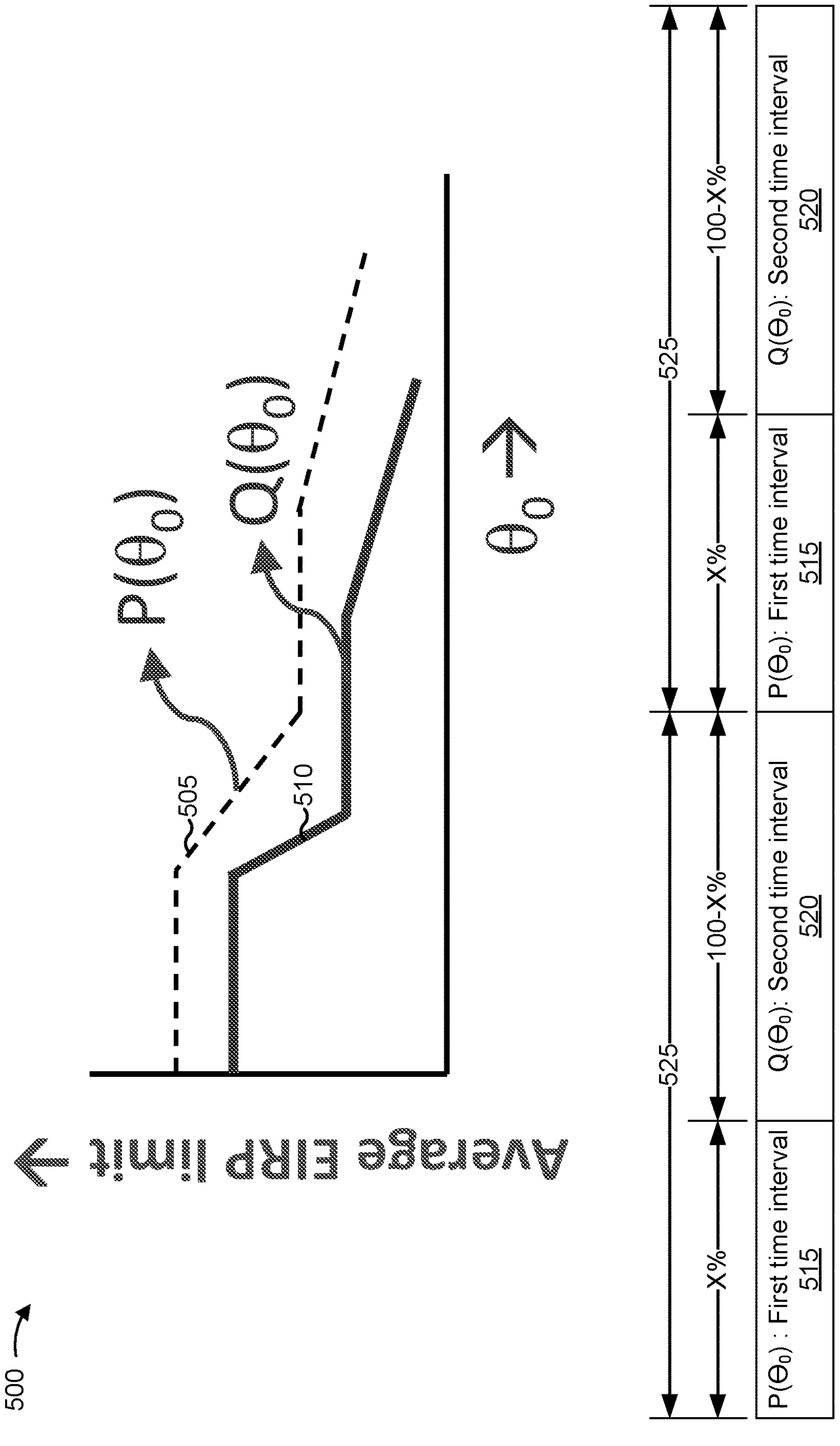
FIG. 5 is a diagram illustrating an example of a first effective isotropic radiated power (EIRP) limit and a second EIRP limit as a function of an elevation angle, in accordance with the present disclosure.

FIG. 5 is a diagram illustrating an example 500 of a first EIRP limit 505 and a second EIRP limit 510 as a function of an elevation angle $\theta_0$, in accordance with the present disclosure. The first EIRP limit 505 may be denoted $P(\theta_0)$ and the second EIRP limit 510 may be denoted $Q(\theta_0)$. In some aspects, the first EIRP limit 505 or the second EIRP limit 510 may include an average EIRP limit (e.g., averaged over a time window), such as an average of an EIRP for a certain elevation angle (over a certain beamspace) with different elevation bins. In some aspects, the first EIRP limit 505 or the second EIRP limit 510 may include an instantaneous EIRP limit. An instantaneous EIRP limit (also referred to as a maximum EIRP limit) may indicate a maximum allowed EIRP at a certain elevation angle. It should be noted that "second EIRP limit" can refer to $Q(\theta_0)$ (as in the second EIRP limit 510), or can refer to an average or instantaneous EIRP limit that is derived using one or more of $P(\theta_0)$ or $Q(\theta_0)$ (such as $P_{avg}'(\theta_0)$ or $P_{max}'(\theta_0)$, described below). In some aspects, the first EIRP limit 505 may be referred to as a Type-1 EIRP limit and the second EIRP limit 510 may be referred to as a Type-2 EIRP limit. In some aspects, the first EIRP limit 505 may be referred to as an EIRP limit for DFT beamforming vectors, and the second EIRP limit 510 may be referred to as an EIRP limit for multi-beams.

The first EIRP limit 505 may be associated with a first beamforming vector (e.g., a set of first beamforming vectors) corresponding to a single peak in a beamspace. For example, the first EIRP limit 505 may indicate an EIRP limit for when single beamspace peak beamforming vectors are used. The second EIRP limit 510 may be associated with a second beamforming vector (e.g., a set of second beamforming vectors) corresponding to two or more peaks in the beamspace. For example, the second EIRP limit 510 may be for a multi-beam communication condition during which a network entity or a set of network entities transmit(s) using a multi-beam.

In some aspects, a multi-beam communication condition may include concurrent transmission using a beamforming vector with at least two peaks (e.g., energy peaks) in a beamspace. For example, a multi-beam communication condition may include a network entity transmitting a multi-beam. In some aspects, a multi-beam communication condition may be associated with a MU-MIMO communication. For example, the MU-MIMO communication may be from multiple transmit nodes (e.g., TRPs, RUs) as observed at a victim node (e.g., a UE, a network entity). In this example, the first EIRP limit 505 and the second EIRP limit 510 may apply for the multiple transmit nodes.

The second EIRP limit 510 may be lower than the first EIRP limit 505. For example, the second EIRP limit 510 may be lower than the first EIRP limit 505 over a side lobe direction set such as an enhanced side lobe direction set. The side lobe direction set may indicate one or more directions of side lobes of the second beamforming vector. Thus, the second EIRP limit 510 may be implemented as a more pessimistic EIRP limit than the first EIRP limit 505, to account for unintended secondary/side/back lobes of multi-beams.

In some aspects, the first EIRP limit 505 may be associated with a first time interval 515 and the second EIRP limit 510 may be associated with a second time interval 520. For example, the network entity may transmit using the first beamforming vector (e.g., the set of first beamforming vectors) and may conform to the first EIRP limit 505 during the first time interval 515. The network entity may transmit using the second beamforming vector (e.g., the set of second beamforming vectors) and may conform to the second EIRP limit 510 during the second time interval 520. As shown, the first time interval 515 and the second time interval 520 sum to 100 percent of a time window 525 (where the first time interval 515 is X percent of the time window 525 and the second time interval 520 is (100 minus X) percent of the time window 525). For example, the first time interval 515 and the second time interval 520 may constitute a cycle. X can be any percentage value.

As mentioned, the second EIRP limit 510 may be implemented as an average EIRP limit or a maximum (e.g., instantaneous) EIRP limit. For example, if implemented as an average EIRP limit, the second EIRP limit 510 may be implemented as $P_{avg}'(\theta_0)$ using an expression of the form $P_{avg}'(\theta_0)=(P(\theta_0)X+Q(\theta_0)(100-X))/100$. If implemented as a maximum EIRP limit, the second EIRP limit may be implemented as $P_{max}'(\theta_0)$ using an expression of the form $P_{max}'(\theta_0)=\min(P(\theta_0), Q(\theta_0))$.

In some aspects, the first EIRP limit 505 may be associated with a first beam direction and the second EIRP limit 510 may be associated with a second set of beam directions. For example, the network entity may transmit in accordance with the first EIRP limit 505 when transmitting in the first beam direction and may transmit in accordance with the second EIRP limit 510 when transmitting in the second set of beam directions. In some aspects, the second EIRP limit 510 may be associated with the second set of beam directions because the second EIRP limit 510 may be associated with the second beamforming vector having at least two peaks in the beamspace. For example, the second set of beam directions may include two or more beam directions. In some aspects, the first beam direction may be a non-side-lobe direction (e.g., an energy peak of a single peak vector). Thus, the network entity may use the first EIRP limit 505 for non-side-lobe directions and the second EIRP limit for side-lobe directions. When using the first EIRP limit 505 for the first beam direction and the second EIRP limit 510 for the second set of beam directions, the network entity may use the first EIRP limit 505 during a first time interval and the second EIRP limit 510 during a second time interval. For example, the first time interval may be while the network entity transmits in the first beam direction and the second time interval may be while the network entity transmits in the second set of beam directions. In this context, the first time interval and the second time interval may, or may not, be periodic and/or defined by X percent and (100 minus X) percent of a time window 525.

In some aspects, a network entity may transmit using the first EIRP limit 505 and the second EIRP limit 510. For example, the first EIRP limit 505 ($P(\theta_0)$), the second EIRP limit 510 (in this context, $Q(\theta_0)$), and a length of the first time interval 515 and the second time interval 520 may be configured for the network entity or pre-configured (such as in a wireless communication specification). The first EIRP limit 505 ($P(\theta_0)$), the second EIRP limit 510 (in this context, $Q(\theta_0)$), and the length of the first time interval 515 and the second time interval 520 may be configured as part of, or may comprise, an EIRP mask. Additionally, or alternatively, one or more first beam directions (associated with the first EIRP limit 505) and one or more sets of second beam directions (associated with the second EIRP limit 510) may be configured as part of or may comprise the EIRP mask. The network entity may transmit using the EIRP mask, such that at any elevation angle $\theta_0$, the EIRP mask is not violated.

As another example of transmitting using the first EIRP limit 505 and the second EIRP limit 510, an average EIRP $P_{avg}'(\theta_0)$ and/or a maximum EIRP $P_{max}'(\theta_0)$ may be configured as part of or may comprise an EIRP mask. The average EIRP and the maximum EIRP may be derived from the first EIRP limit 505 and the second EIRP limit 510, as described above. The network entity may transmit using the EIRP mask, such that the average EIRP and/or the maximum EIRP are not violated at any elevation angle $\theta_0$. As noted above, in some contexts, the average EIRP and/or the maximum EIRP may be referred to as a second EIRP limit, since these EIRPs may govern multi-beam communication, whereas the first EIRP limit 505 may govern single-beam communication.

As indicated above, FIG. 5 is provided as an example. Other examples may differ from what is described with regard to FIG. 5.

Figure 6:
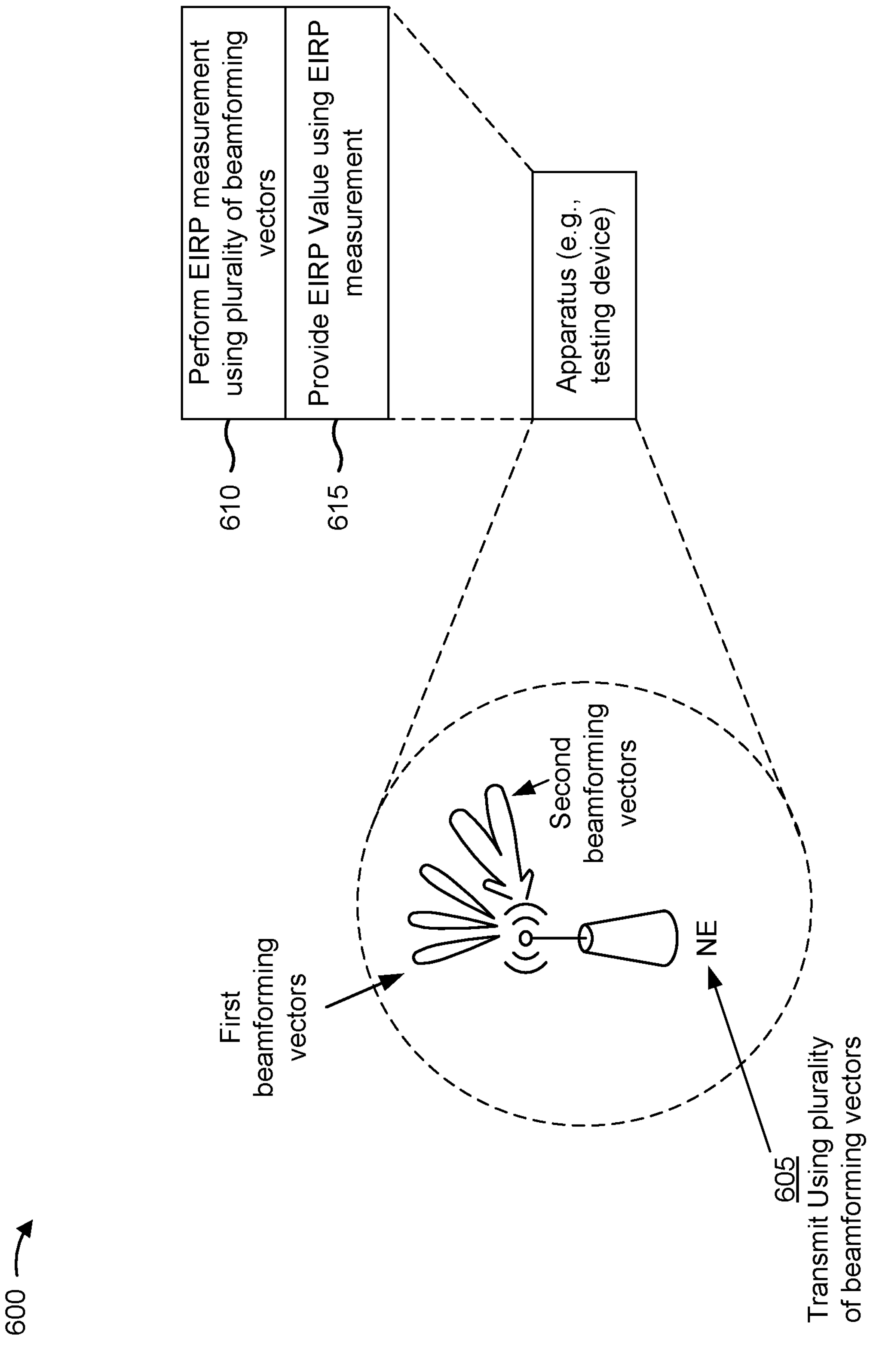
FIG. 6 is a diagram illustrating an example of EIRP measurement using first beamforming vectors and second beamforming vectors, in accordance with the present disclosure.

FIG. 6 is a diagram illustrating an example 600 of EIRP measurement using first beamforming vectors and second beamforming vectors, in accordance with the present disclosure. Example 600 includes a network entity (e.g., BS 110, the network entity of FIG. 5) and an apparatus. The apparatus may include a testing device. The apparatus may include one or more components configured to collect radio measurements (e.g., gain measurements or another measurement that can be used to derive an EIRP measurement). In some aspects, the apparatus and the network entity may be deployed in a testing environment. In some aspects, the network entity may be deployed in the field, and the apparatus may perform at least a subset of the EIRP measurements described herein, which may aid in determining compliance with EIRP limits (such as the EIRP limits described in connection with FIG. 5).

As shown by reference number 605, the network entity may transmit using a plurality of beamforming vectors, denoted K. The plurality of beamforming vectors may include at least a set of first $K_1$ beamforming vectors and a second set of beamforming vectors. Each beamforming vector of the first set $K_1$ of beamforming vectors may have only one peak (e.g., energy peak) in a beamspace. Each beamforming vector of the second set of beamforming vectors may have at least two peaks in the beamspace. For example, K may include $K_1, K_2, \ldots K_L$, each referred to as a set of beamforming vectors. Beamforming vectors belonging to $K_l$ may have l peaks in the beamspace. For example, beamforming vectors belonging to $K_2$ may have only two peaks in the beamspace. Supporting L=2 may be sufficient for covering multi-beam communication in EIRP mask specifications. In some aspects, L may be configured or pre-specified, such as in a configuration message or a wireless communication specification. For example, L may be configured based on regulatory and testing requirements.

As further shown, in some aspects, the network entity may transmit using the plurality of beamforming vectors and using a configuration. The configuration may include one or more parameters for transmission using a set of beamforming vectors, such as the set of second beamforming vectors. For example, the configuration may indicate a number of antenna panels to be used to transmit the set of beamforming vectors (e.g., one antenna panel, two antenna panels, etc.). As another example, the configuration may indicate an array size of an antenna panel (e.g., one or more array sizes for transmission of one or more beams including a multi-beam). As another example, the configuration may indicate a steering parameter of an array of an antenna panel (e.g., indicating a configuration for steering a beam generated by the array or the antenna panel). As another example, the configuration may indicate a peak direction of an array, such as a direction associated with an energy peak of a beam generated by the array. As another example, the configuration may indicate a power split between two directions of the array. For example, the power split may indicate a distribution of transmit power or energy between a first direction or peak and a second direction or peak. Thus, the configuration may define parameters that define EIRP emissions at a given elevation angle.

In some aspects, the configuration indicates one or more beam weights of the plurality of beamforming vectors. For example, in addition to or as an alternative to the parameters described above, the configuration may indicate one or more beam weights (e.g., $w_k$) of one or more beamforming vectors.

In some aspects, the configuration indicates time resources for transmission or measurement of the plurality of beamforming vectors. For example, the configuration may include information, such as a reference signal configuration, that indicates particular times to transmit using one or more beamforming vectors. For example, the configuration may indicate symbols that are pre-configured (such as in a wireless communication specification) with beams for transmissions from the network entity (e.g., aggressor node). In some aspects, the configuration may indicate a first time resource for a first beamforming vector, a second time resource for a second beamforming vector, and so on. In some aspects, the configuration may indicate a first time resource for a first direction, a second time resource for a second set of directions, and so on.

As shown by reference number 610, the apparatus may perform EIRP measurement using the plurality of beamforming vectors. For example, the apparatus may perform EIRP measurement on time and/or frequency and/or spatial resources that are mapped to transmissions that use the plurality of beamforming vectors, such that the apparatus measures a given beamforming vector at a given time resource. For example, the apparatus may measure array gain (or received signal strength) over different elevation and/or azimuth angles associated with (e.g., around) the aggressor node, as indicated by a dashed line. In some aspects, the apparatus may perform the EIRP measurement in association with defined elevation angles and/or defined azimuth angles. For example, at a given elevation angle $\theta_0$, the apparatus may perform the EIRP measurement corresponding to each azimuth angle $\phi_n$ of n=1, . . . , N azimuth angles. The EIRP measurement may include any form of measurement, such as a gain measurement, a signal strength measurement, or the like. It should be noted that, in some aspects, the apparatus may perform the EIRP measurement in association with the defined elevation angles and/or azimuth angles, and without regard for the plurality of beamforming vectors. For example, the elevation angles and/or azimuth angles may be configured for an EIRP measurement on a transmitter that transmits using the plurality of beamforming vectors, but the apparatus may not be configured with or use the plurality of beamforming vectors for the EIRP measurement. In this sense, the EIRP measurement may be associated with the plurality of beamforming vectors, but may not use the plurality of beamforming vectors. In this example, an EIRP value may be associated with the plurality of beamforming vectors. For example, the EIRP value may be computed across the plurality of beam vectors, as described below.

As shown by reference number 615, the apparatus may provide an EIRP value using the EIRP measurement. For example, the apparatus may calculate the EIRP value using the EIRP measurement. The EIRP value may indicate an EIRP. For example, the EIRP value may indicate an average EIRP at an elevation angle $\theta_0$. As another example, the EIRP value may indicate an instantaneous (e.g., maximum) EIRP at the elevation angle $\theta_0$. In some aspects, the average EIRP may be computed as a weighted average of gains (e.g., EIRP measurements). The gains may use averaging over a set of azimuth angles and a set of beamforming vectors, as described below. In some aspects, the weighted average may use one or more weights to average the gains. As an example, the average EIRP $\tilde{P}(\theta_0)$ for an elevation angle $\theta_0$ may be calculated using an expression of the form $$\frac{1}{KN}\left(\sum_{k=1}^{K}\Sigma_{n=1}^{N} w_{n,k} * \mathrm{Gain}(\theta_0, \phi_n, w_k)\right),$$

where K is the plurality of beamforming vectors, N is the number of azimuth angles sampled for averaging purposes, $\phi_n$ is an azimuth angle where an individual EIRP measurement is made, $w_k$ is one or more beam weights, and $w_{n,k}$ is a weight for weighted averaging of beamforming vector k and azimuth angle $\phi_n$. In some aspects, the weights for weighted averaging may be specified, such as in a wireless communication specification.

As indicated above, FIG. 6 is provided as an example. Other examples may differ from what is described with regard to FIG. 6.

Figure 7:
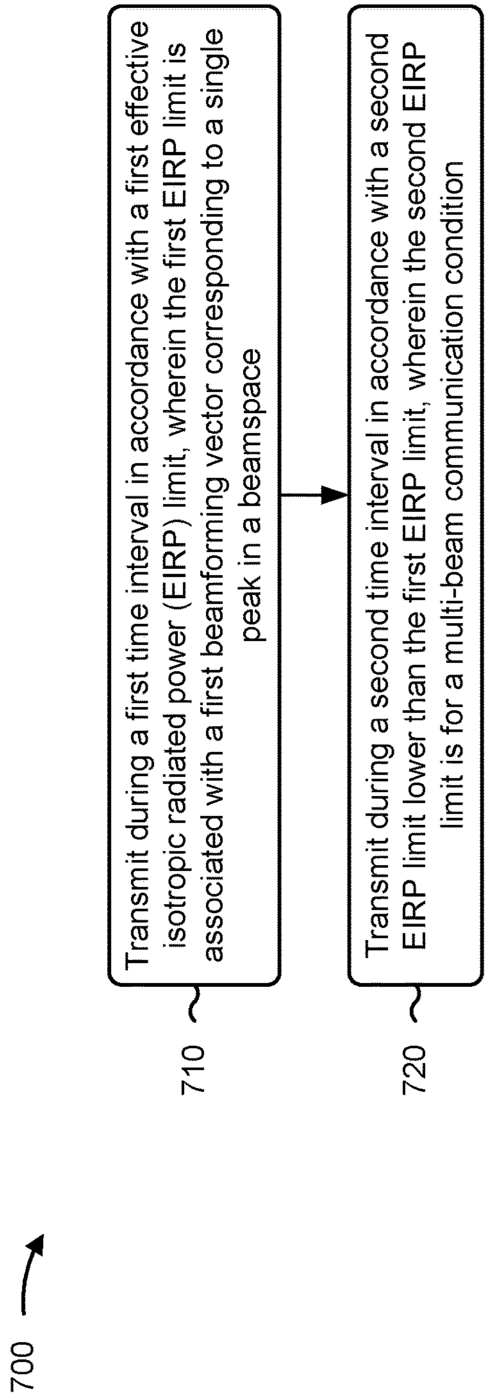
FIG. 7 is a flowchart of an example method of wireless communication.

FIG. 7 is a flowchart of an example method 700 of wireless communication. The method 700 may be performed at, for example, a network entity (e.g., base station 110 or a component of a disaggregated base station) or an apparatus of a network entity.

Method 700 begins at 710 with transmitting during a first time interval in accordance with a first EIRP limit, wherein the first EIRP limit is associated with a first beamforming vector corresponding to a single peak in a beamspace. For example, the network entity may transmit during a first time interval in accordance with a first EIRP limit, wherein the first EIRP limit is associated with a first beamforming vector corresponding to a single peak in a beamspace, as described above in connection with, for example, FIG. 5.

Method 700 continues at 720 with transmitting during a second time interval in accordance with a second EIRP limit lower than the first EIRP limit, wherein the second EIRP limit is for a multi-beam communication condition. For example, the network entity may transmit during a second time interval in accordance with a second EIRP limit lower than the first EIRP limit, wherein the second EIRP limit is for a multi-beam communication condition, as described above in connection with, for example, FIG. 5.

In some aspects, the multi-beam communication condition includes concurrent transmission using a second beamforming vector with at least two peaks in the beamspace.

In some aspects, the multi-beam communication condition is associated with a multiple user multiple input multiple output communication, from multiple transmit nodes, as observed at a victim node.

In some aspects, the first time interval comprises a first percentage of a time window and the second time interval comprises a second percentage of the time window, wherein the first percentage and the second percentage sum to 100 percent.

In some aspects, transmitting in accordance with the first EIRP limit further comprises transmitting a first communication in a first beam direction, wherein the first EIRP limit is associated with the first beam direction, and wherein transmitting in accordance with the second EIRP limit further comprises transmitting a second communication in a second set of beam directions, wherein the second EIRP limit is associated with the second set of beam directions.

In some aspects, the second set of beam directions is associated with at least one of one or more secondary lobes of a multi-beam, one or more side lobes of the multi-beam, or one or more back lobes of the multi-beam.

In some aspects, the first EIRP limit comprises at least one of a first average EIRP limit, a first maximum EIRP limit, or a first instantaneous EIRP limit.

In some aspects, the second EIRP limit comprises at least one of a second average EIRP limit, a second maximum EIRP limit, or a combined EIRP limit that uses a single-beam EIRP limit and a multi-beam EIRP limit.

Figure 9:
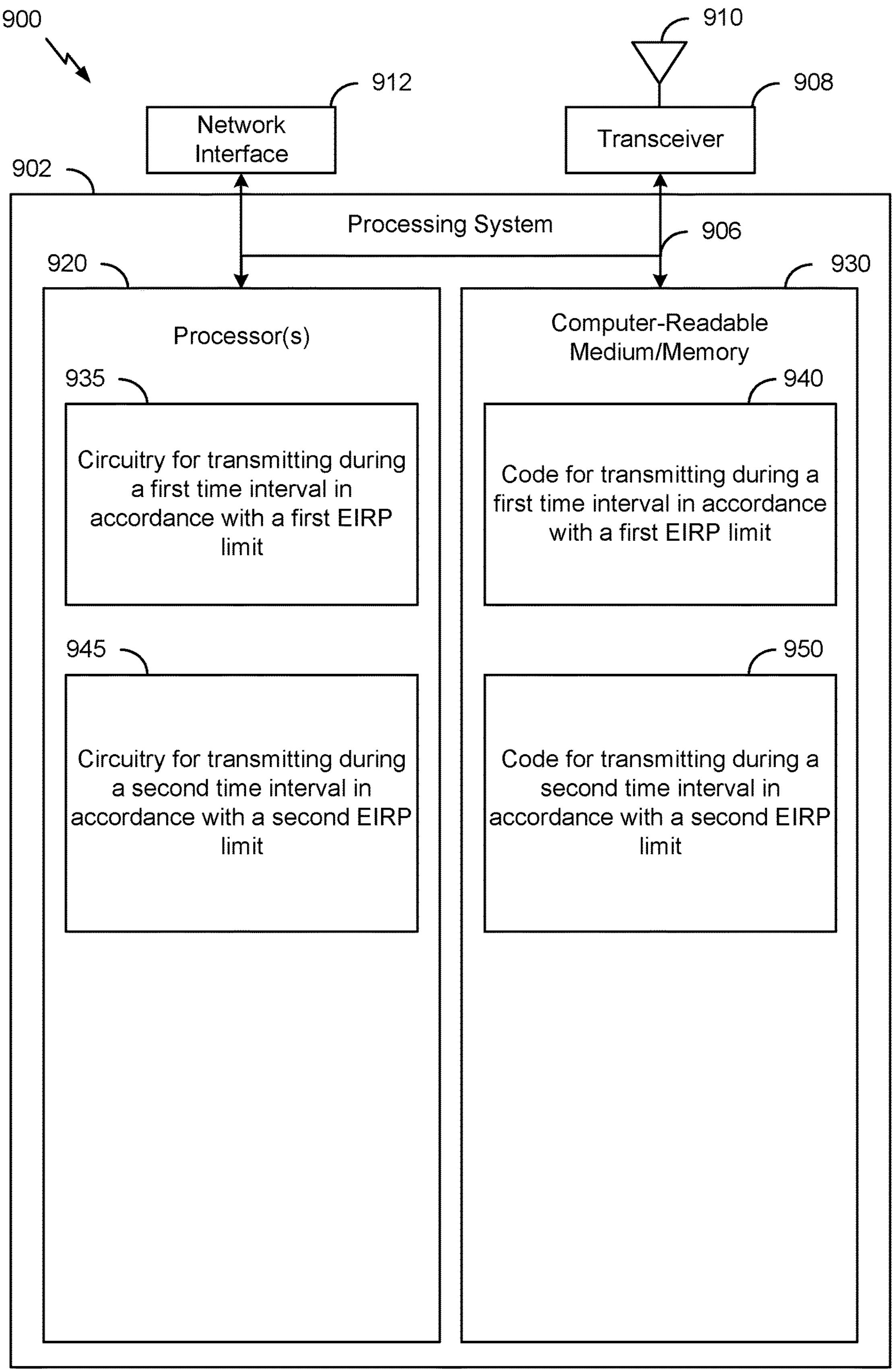
FIG. 9 is a diagram illustrating an example of an implementation of code and circuitry for a communications device, in accordance with the present disclosure.

In one aspect, method 700, or any aspect related to it, may be performed by an apparatus, such as communications device 900 of FIG. 9, which includes various components operable, configured, or adapted to perform the method 700. Communications device 900 is described below in further detail.

Although FIG. 7 shows example blocks of method 700, in some aspects, method 700 may include additional blocks, fewer blocks, different blocks, or differently arranged blocks than those depicted in FIG. 7. Additionally, or alternatively, two or more of the blocks of method 700 may be performed in parallel.

Figure 8:
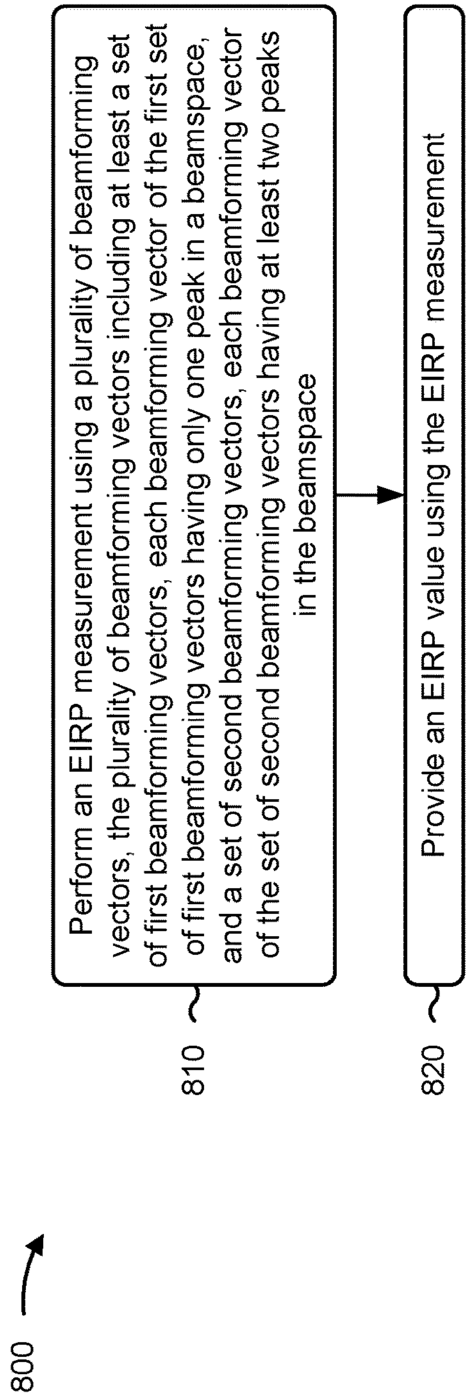
FIG. 8 is a flowchart of an example method of wireless communication.

FIG. 8 is a flowchart of an example method 800 of wireless communication. The method 800 may be performed at, for example, an apparatus (e.g., the apparatus of FIG. 6, device 1100).

Method 800 begins at 810 with performing an EIRP measurement associated with a plurality of beamforming vectors, the plurality of beamforming vectors including at least a set of first beamforming vectors, each beamforming vector of the first set of first beamforming vectors having only one peak in a beamspace, and a set of second beamforming vectors, each beamforming vector of the set of second beamforming vectors having at least two peaks in the beamspace, as described above in connection with, for example, FIG. 6 and at 610. The EIRP measurement may be associated with the plurality of beamforming vectors in that an EIRP value derived from the EIRP measurement is used for EIRP limit determination for the plurality of beamforming vectors.

Method 800 then proceeds at 820 with providing an EIRP value using the EIRP measurement. For example, the apparatus may provide an EIRP value using the EIRP measurement, as described above in connection with, for example, FIG. 6 and at 615. In some aspects, the EIRP value is associated with a plurality of beamforming vectors, the plurality of beamforming vectors including at least a set of first beamforming vectors, each beamforming vector of the first set of first beamforming vectors having only one peak in a beamspace, and a set of second beamforming vectors, each beamforming vector of the set of second beamforming vectors having at least two peaks in the beamspace. For example, the EIRP value may be computed as a weighted average of gains with averaging over a set of azimuth angles and a set of beamforming vectors of the plurality of beamforming vectors. As another example, the EIRP value may be associated with or may use the plurality of beamforming vectors, and performing the EIRP measurement may not be associated with or use the plurality of beamforming vectors.

In some aspects, the plurality of beamforming vectors includes a set of third beamforming vectors, wherein each beamforming vector of the set of third beamforming vectors has more than two peaks.

In some aspects, performing the EIRP measurement further comprises performing the EIRP measurement using a configuration that indicates at least one of a number of antenna panels, an array size of an antenna panel, a steering parameter of an array of the antenna panel, a peak direction of the array, or a power split between two directions of the array.

In some aspects, the configuration indicates one or more beam weights of the plurality of beamforming vectors.

In some aspects, the configuration indicates time resources for transmission or measurement of the plurality of beamforming vectors.

In some aspects, performing the EIRP measurement further comprises performing the EIRP measurement over a sphere associated with a transmitting node.

In some aspects, the EIRP value is computed as a weighted average of gains with averaging over a set of azimuth angles and a set of beamforming vectors.

In some aspects, the weighted average uses one or more weights to average the gains across the set of azimuth angles.

Figure 10:
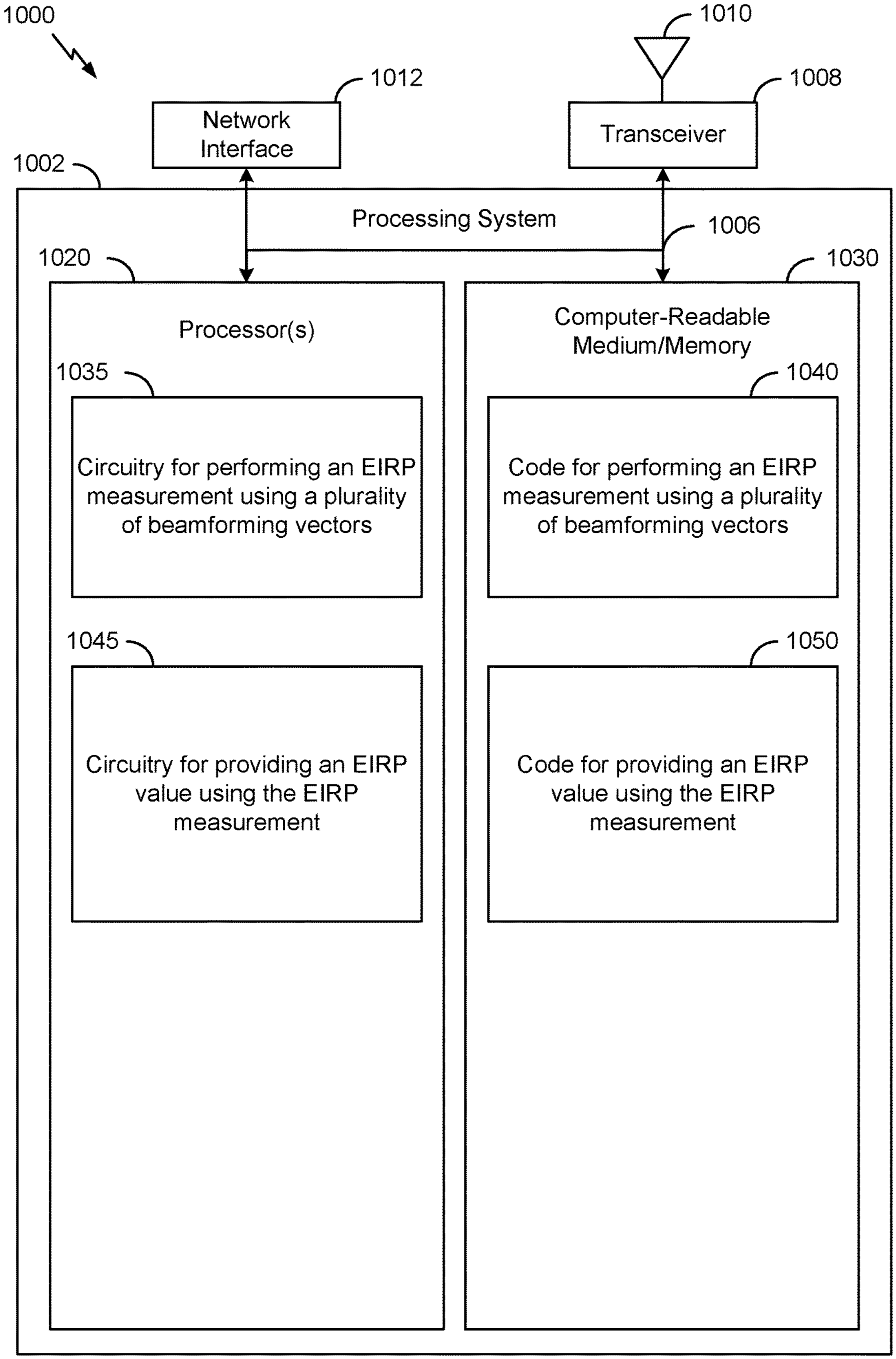
FIG. 10 is a diagram illustrating an example of an implementation of code and circuitry for a communications device, in accordance with the present disclosure.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Although FIG. 8 shows example blocks of method 800, in some aspects, method 800 may include additional blocks, fewer blocks, different blocks, or differently arranged blocks than those depicted in FIG. 8. Additionally, or alternatively, two or more of the blocks of method 800 may be performed in parallel.

FIG. 9 is a diagram illustrating an example of an implementation of code and circuitry for a communications device 900, in accordance with the present disclosure. The communications device 900 may be a network entity (such as BS 110 or a disaggregated base station as described with regard to FIG. 3), or a network entity may include the communications device 900.

The communications device 900 includes a processing system 902 coupled to a transceiver 908 (e.g., a transmitter and/or a receiver, and which may include a single transceivers or multiple transceivers which may perform different operations described as being performed by the transceiver 908). The transceiver 908 is configured to transmit and receive signals for the communications device 900 via an antenna 910 (e.g., one or more antennas), such as the various signals as described herein. The network interface 912 is configured to obtain and send signals for the communications device 900 via communications link(s), such as a backhaul link, midhaul link, and/or fronthaul link as described herein, such as with respect to FIG. 3. The processing system 902 may be configured to perform processing functions for the communications device 900, including processing signals received and/or to be transmitted by the communications device 900.

The processing system 902 includes one or more processors 920. In various aspects, the one or more processors 920 may include one or more of receive processor 238, transmit processor 220, TX MIMO processor 230, and/or controller/processor 240, as described with respect to FIG. 2. The one or more processors 920 are coupled to a computer-readable medium/memory 930 via a bus 906. In various aspects, the computer-readable medium/memory 930 may include one or more memories such as memory 242, as described with respect to FIG. 2. In certain aspects, the computer-readable medium/memory 930 is configured to store instructions (e.g., computer-executable code, processor-executable code) that when executed by the one or more processors 920, cause the one or more processors 920 to perform the method 700 described with respect to FIG. 7, or any aspect related to it. Note that reference to a processor performing a function of communications device 900 may include one or more processors performing that function of communications device 900. Note also that reference to one or more processors performing multiple functions may include a first processor performing a first function of the multiple functions and a second processor performing a second function of the multiple functions.

As shown in FIG. 9, the communications device 900 may include circuitry for transmitting during a first time interval in accordance with a first EIRP limit (circuitry 935).

As shown in FIG. 9, the communications device 900 may include, stored in computer-readable medium/memory 930, code for transmitting during a first time interval in accordance with a first EIRP limit (code 940).

As shown in FIG. 9, the communications device 900 may include circuitry for transmitting during a second time interval in accordance with a second EIRP limit lower than the first EIRP limit (circuitry 945).

As shown in FIG. 9, the communications device 900 may include, stored in computer-readable medium/memory 930, code for transmitting during a second time interval in accordance with a second EIRP limit lower than the first EIRP limit (code 950).

Various components of the communications device 900 may provide means for performing the method 700 described with respect to FIG. 7, or any aspect related to it. For example, means for transmitting, sending, or outputting for transmission may include the transceiver(s) 232 and/or antenna(s) 234 of the BS 110 and/or the transceiver 908 and/or antenna 910 of the communications device 900 in FIG. 9. Means for receiving or obtaining may include the transceiver(s) 232 and/or antenna(s) 234 of the BS 110 and/or the transceiver 908 and/or antenna 910 of the communications device 900 in FIG. 9.

FIG. 9 is provided as an example. Other examples may differ from what is described in connection with FIG. 9.

FIG. 10 is a diagram illustrating an example of an implementation of code and circuitry for a communications device 1000, in accordance with the present disclosure. The communications device 1000 may be an apparatus (such as BS 110 or a disaggregated base station as described with regard to FIG. 3, a testing device, or the device 1100), or an apparatus may include the communications device 1000.

The communications device 1000 includes a processing system 1002 coupled to a transceiver 1008 (e.g., a transmitter and/or a receiver, and which may include a single transceivers or multiple transceivers which may perform different operations described as being performed by the transceiver 1008). The transceiver 1008 is configured to transmit and receive signals for the communications device 1000 via an antenna 1010 (e.g., one or more antennas), such as the various signals as described herein. The network interface 1012 is configured to obtain and send signals for the communications device 1000 via communications link(s), such as a backhaul link, midhaul link, and/or fronthaul link as described herein, such as with respect to FIG. 3. The processing system 1002 may be configured to perform processing functions for the communications device 1000, including processing signals received and/or to be transmitted by the communications device 1000.

The processing system 1002 includes one or more processors 1020. In various aspects, the one or more processors 1020 may include one or more of receive processor 238, transmit processor 220, TX MIMO processor 230, and/or controller/processor 240, as described with respect to FIG. 2. The one or more processors 1020 are coupled to a computer-readable medium/memory 1030 via a bus 1006. In various aspects, the computer-readable medium/memory 1030 may include one or more memories such as memory 242, as described with respect to FIG. 2. In certain aspects, the computer-readable medium/memory 1030 is configured to store instructions (e.g., computer-executable code, processor-executable code) that when executed by the one or more processors 1020, cause the one or more processors 1020 to perform the method 800 described with respect to FIG. 8, or any aspect related to it. Note that reference to a processor performing a function of communications device 1000 may include one or more processors performing that function of communications device 1000. Note also that reference to one or more processors performing multiple functions may include a first processor performing a first function of the multiple functions and a second processor performing a second function of the multiple functions.

As shown in FIG. 10, the communications device 1000 may include circuitry for performing an EIRP measurement using a plurality of beamforming vectors (circuitry 1035).

As shown in FIG. 10, the communications device 1000 may include, stored in computer-readable medium/memory 1030, code for performing an EIRP measurement using a plurality of beamforming vectors (code 1040).

As shown in FIG. 10, the communications device 1000 may include circuitry for providing an EIRP value using the EIRP measurement (circuitry 1045).

As shown in FIG. 10, the communications device 1000 may include, stored in computer-readable medium/memory 1030, code for providing an EIRP value using the EIRP measurement (code 1050).

Various components of the communications device 1000 may provide means for performing the method 800 described with respect to FIG. 8, or any aspect related to it. For example, means for transmitting, sending, or outputting for transmission may include the transceiver(s) 232 and/or antenna(s) 234 of the BS 110 and/or the transceiver 1008 and/or antenna 1010 of the communications device 1000 in FIG. 10. Means for receiving or obtaining may include the transceiver(s) 232 and/or antenna(s) 234 of the BS 110 and/or the transceiver 1008 and/or antenna 1010 of the communications device 1000 in FIG. 10.

FIG. 10 is provided as an example. Other examples may differ from what is described in connection with FIG. 10.

Figure 11:
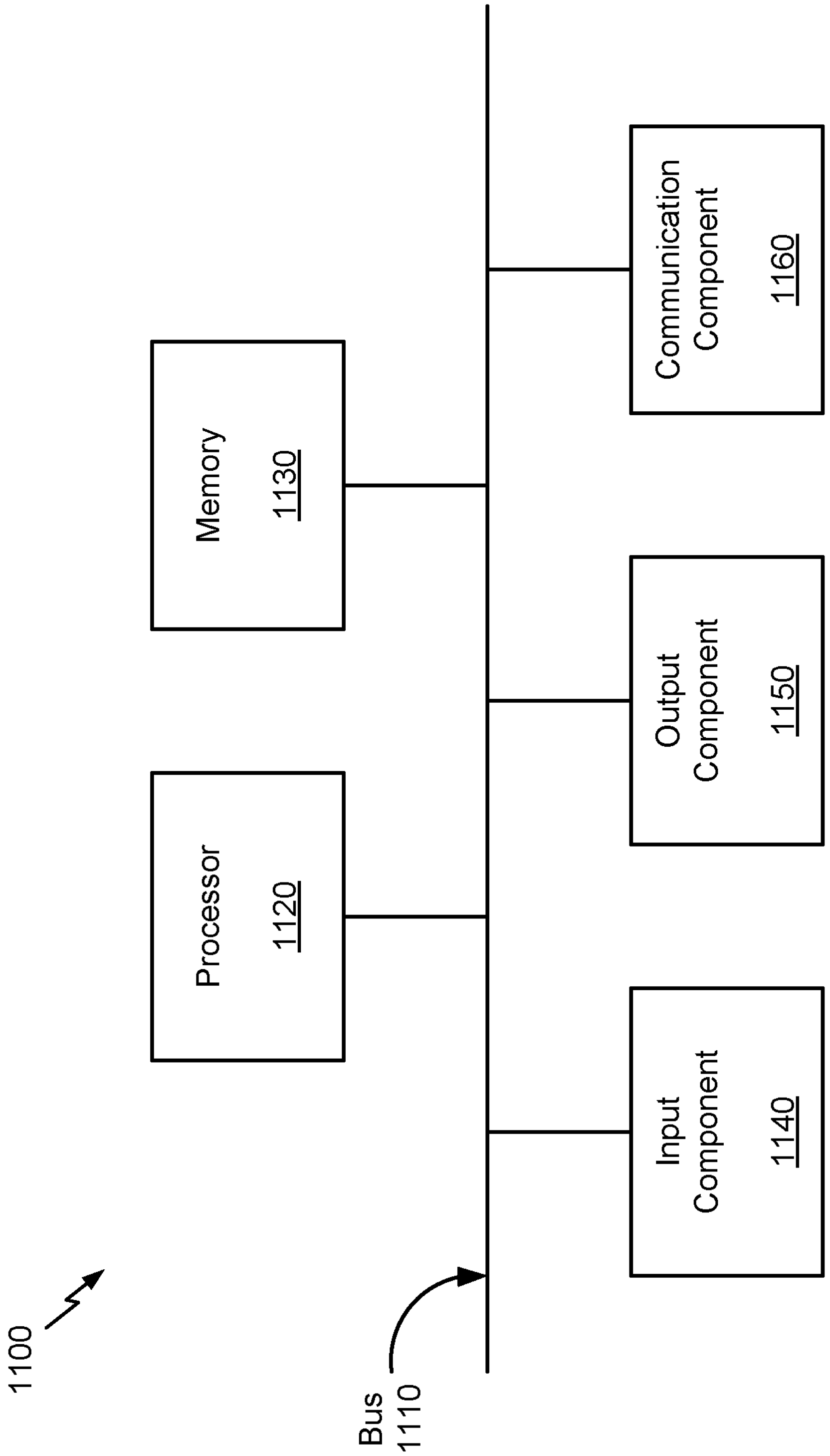
FIG. 11 is a diagram of example components of a device associated with EIRP measurement.

FIG. 11 is a diagram of example components of a device 1100 associated with EIRP measurement. The device 1100 may correspond to the apparatus of FIG. 6 or the communication device 1000. In some implementations, the apparatus of FIG. 6 or the communication device 1000 may include one or more devices 1100 and/or one or more components of the device 1100. As shown in FIG. 11, the device 1100 may include a bus 1110, a processor 1120, a memory 1130, an input component 1140, an output component 1150, and/or a communication component 1160.

The bus 1110 may include one or more components that enable wired and/or wireless communication among the components of the device 1100. The bus 1110 may couple together two or more components of FIG. 11, such as via operative coupling, communicative coupling, electronic coupling, and/or electric coupling. For example, the bus 1110 may include an electrical connection (e.g., a wire, a trace, and/or a lead) and/or a wireless bus. The processor 1120 may include a central processing unit, a graphics processing unit, a microprocessor, a controller, a microcontroller, a digital signal processor, a field-programmable gate array, an application-specific integrated circuit, and/or another type of processing component. The processor 1120 may be implemented in hardware, firmware, or a combination of hardware and software. In some implementations, the processor 1120 may include one or more processors capable of being programmed to perform one or more operations or processes described elsewhere herein.

The memory 1130 may include volatile and/or nonvolatile memory. For example, the memory 1130 may include random access memory (RAM), read only memory (ROM), a hard disk drive, and/or another type of memory (e.g., a flash memory, a magnetic memory, and/or an optical memory). The memory 1130 may include internal memory (e.g., RAM, ROM, or a hard disk drive) and/or removable memory (e.g., removable via a universal serial bus connection). The memory 1130 may be a non-transitory computer-readable medium. The memory 1130 may store information, one or more instructions, and/or software (e.g., one or more software applications) related to the operation of the device 1100. In some implementations, the memory 1130 may include one or more memories that are coupled (e.g., communicatively coupled) to one or more processors (e.g., processor 1120), such as via the bus 1110. Communicative coupling between a processor 1120 and a memory 1130 may enable the processor 1120 to read and/or process information stored in the memory 1130 and/or to store information in the memory 1130.

The input component 1140 may enable the device 1100 to receive input, such as user input and/or sensed input. For example, the input component 1140 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 1150 may enable the device 1100 to provide output, such as via a display, a speaker, and/or a light-emitting diode. The communication component 1160 may enable the device 1100 to communicate with other devices via a wired connection and/or a wireless connection. For example, the communication component 1160 may include a receiver, a transmitter, a transceiver, a modem, a network interface card, and/or an antenna.

The device 1100 may perform one or more operations or processes described herein. For example, a non-transitory computer-readable medium (e.g., memory 1130) may store a set of instructions (e.g., one or more instructions or code) for execution by the processor 1120. The processor 1120 may execute the set of instructions to perform one or more operations or processes described herein. In some implementations, execution of the set of instructions, by one or more processors 1120, causes the one or more processors 1120 and/or the device 1100 to perform one or more operations or processes described herein. In some implementations, hardwired circuitry may be used instead of or in combination with the instructions to perform one or more operations or processes described herein. Additionally, or alternatively, the processor 1120 may be configured to perform one or more operations or processes described herein. Thus, implementations described herein are not limited to any specific combination of hardware circuitry and software.

The number and arrangement of components shown in FIG. 11 are provided as an example. The device 1100 may include additional components, fewer components, different components, or differently arranged components than those shown in FIG. 11. Additionally, or alternatively, a set of components (e.g., one or more components) of the device 1100 may perform one or more functions described as being performed by another set of components of the device 1100.

The following provides an overview of some Aspects of the present disclosure:

Aspect 1: A method of wireless communication performed by a network entity, comprising: transmitting during a first time interval in accordance with a first effective isotropic radiated power (EIRP) limit, wherein the first EIRP limit is associated with a first beamforming vector corresponding to a single peak in a beamspace, and transmitting during a second time interval in accordance with a second EIRP limit lower than the first EIRP limit, wherein the second EIRP limit is for a multiple beam (multi-beam) communication condition.

Aspect 2: The method of Aspect 1, wherein the multi-beam communication condition includes concurrent transmission using a second beamforming vector with at least two peaks in the beamspace.

Aspect 3: The method of any of Aspects 1-2, wherein the multi-beam communication condition is associated with a multiple user multiple input multiple output communication, from multiple transmit nodes, as observed at a victim node.

Aspect 4: The method of any of Aspects 1-3, wherein the first time interval comprises a first percentage of a time window and the second time interval comprises a second percentage of the time window, wherein the first percentage and the second percentage sum to 100 percent.

Aspect 5: The method of any of Aspects 1-4, wherein transmitting in accordance with the first EIRP limit further comprises transmitting a first communication in a first beam direction, wherein the first EIRP limit is associated with the first beam direction, and wherein transmitting in accordance with the second EIRP limit further comprises transmitting a second communication in a second set of beam directions, wherein the second EIRP limit is associated with the second set of beam directions.

Aspect 6: The method of Aspect 5, wherein the second set of beam directions is associated with at least one of: one or more secondary lobes of a multi-beam, one or more side lobes of the multi-beam, or one or more back lobes of the multi-beam.

Aspect 7: The method of any of Aspects 1-6, wherein the first EIRP limit comprises at least one of a first average EIRP limit, a first maximum EIRP limit, or a first instantaneous EIRP limit.

Aspect 8: The method of any of Aspects 1-7, wherein the second EIRP limit comprises at least one of: a second average EIRP limit, a second maximum EIRP limit, or a combined EIRP limit that uses a single-beam EIRP limit and a multi-beam EIRP limit.

Aspect 9: A method of wireless communication performed by an apparatus, comprising: performing an effective isotropic radiated power (EIRP) measurement associated with a plurality of beamforming vectors, the plurality of beamforming vectors including at least: a set of first beamforming vectors, each beamforming vector of the first set of first beamforming vectors having only one peak in a beamspace, and a set of second beamforming vectors, each beamforming vector of the set of second beamforming vectors having at least two peaks in the beamspace; and providing an EIRP value using the EIRP measurement.

Aspect 10: The method of Aspect 9, wherein the plurality of beamforming vectors includes a set of third beamforming vectors, wherein each beamforming vector of the set of third beamforming vectors has more than two peaks.

Aspect 11: The method of any of Aspects 9-10, wherein performing the EIRP measurement further comprises performing the EIRP measurement using a configuration that indicates at least one of: a number of antenna panels, an array size of an antenna panel, a steering parameter of an array of the antenna panel, a peak direction of the array, or a power split between two directions of the array.

Aspect 12: The method of Aspect 11, wherein the configuration indicates one or more beam weights of the plurality of beamforming vectors.

Aspect 13: The method of Aspect 11, wherein the configuration indicates time resources for transmission or measurement of the plurality of beamforming vectors.

Aspect 14: The method of Aspect 11, wherein performing the EIRP measurement further comprises performing the EIRP measurement over a sphere associated with a transmitting node.

Aspect 15: The method of any of Aspects 9-14, wherein the EIRP value is computed as a weighted average of gains with averaging over a set of azimuth angles and a set of beamforming vectors.

Aspect 16: The method of Aspect 15, wherein the weighted average uses one or more weights to average the gains across the set of azimuth angles.

Aspect 17: A method of wireless communication performed by an apparatus, comprising: performing an effective isotropic radiated power (EIRP) measurement; and providing an EIRP value using the EIRP measurement, wherein the EIRP value associated with a plurality of beamforming vectors, the plurality of beamforming vectors including at least: a set of first beamforming vectors, each beamforming vector of the first set of first beamforming vectors having only one peak in a beamspace, and a set of second beamforming vectors, each beamforming vector of the set of second beamforming vectors having at least two peaks in the beamspace.

Aspect 18: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-17.

Aspect 19: An apparatus for wireless communication at a device, the apparatus comprising one or more memories and one or more processors coupled to the one or more memories, the one or more processors configured to cause the device to perform the method of one or more of Aspects 1-17.

Aspect 20: An apparatus for wireless communication, the apparatus comprising at least one means for performing the method of one or more of Aspects 1-17.

Aspect 21: A non-transitory computer-readable medium storing code for wireless communication, the code comprising instructions executable by one or more processors to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

Aspect 23: A device for wireless communication, the device comprising a processing system that includes one or more processors and one or more memories coupled with the one or more processors, the processing system configured to cause the device to perform the method of one or more of Aspects 1-17.

Aspect 24: An apparatus for wireless communication at a device, the apparatus comprising one or more memories and one or more processors coupled to the one or more memories, the one or more processors individually or collectively configured to cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Reference to an element in the singular is not intended to mean only one unless specifically so stated, but rather "one or more." For example, reference to an element (e.g., "a processor," "a controller," "a memory," etc.), unless otherwise specifically stated, should be understood to refer to one or more elements (e.g., "one or more processors," "one or more controllers," "one or more memories," etc.).

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus configured for wireless communication, comprising:

one or more antennas; and a processing system that includes processor circuitry and memory circuitry that stores code for the processor circuitry, the processing system configured to cause the apparatus to:

transmit a first communication in a first beam direction during a first time interval in accordance with a first effective isotropic radiated power (EIRP) limit, wherein the first EIRP limit is associated with a first beamforming vector corresponding to a single peak in a beamspace and with the first beam direction; and transmit a second communication in a second set of beam directions during a second time interval in accordance with a second EIRP limit lower than the first EIRP limit, wherein the second EIRP limit is for a multiple beam (multi-beam) communication condition and is associated with the second set of beam directions, and wherein the second set of beam directions is associated with at least one of:

one or more secondary lobes of a multi-beam, one or more side lobes of the multi-beam, or one or more back lobes of the multi-beam.

2. The apparatus of claim 1, wherein the multi-beam communication condition includes concurrent transmission using a second beamforming vector with at least two peaks in the beamspace.

3. The apparatus of claim 1, wherein the multi-beam communication condition is associated with a multiple user multiple input multiple output communication, from multiple transmit nodes, as observed at a victim node.

4. The apparatus of claim 1, wherein the first time interval comprises a first percentage of a time window and the second time interval comprises a second percentage of the time window, wherein the first percentage and the second percentage sum to 100 percent.

5. The apparatus of claim 1, wherein the first EIRP limit comprises at least one of a first average EIRP limit, a first maximum EIRP limit, or a first instantaneous EIRP limit.

6. The apparatus of claim 1, wherein the second EIRP limit comprises at least one of:

a second average EIRP limit, a second maximum EIRP limit, or a combined EIRP limit that uses a single-beam EIRP limit and a multi-beam EIRP limit.

7. The apparatus of claim 2, wherein the second EIRP limit is lower than the first EIRP limit over a side lobe direction set, wherein the side lobe direction set indicates one or more directions of side lobes of the second beamforming vector.

8. A method of wireless communication performed by a network entity, comprising:

transmitting a first communication in a first beam direction during a first time interval in accordance with a first effective isotropic radiated power (EIRP) limit, wherein the first EIRP limit is associated with a first beamforming vector corresponding to a single peak in a beamspace and with the first beam direction; and transmitting a second communication in a second set of beam directions during a second time interval in accordance with a second EIRP limit lower than the first EIRP limit, wherein the second EIRP limit is for a multiple beam (multi-beam) communication condition and is associated with the second set of beam directions, and wherein the second set of beam directions is associated with at least one of:

one or more secondary lobes of a multi-beam,

One or more side lobes of the multi-beam, or one or more back lobes of the multi-beam.

9. The method of claim 8, wherein the multi-beam communication condition includes concurrent transmission using a second beamforming vector with at least two peaks in the beamspace.

10. The method of claim 9, wherein the second EIRP limit is lower than the first EIRP limit over a side lobe direction set, wherein the side lobe direction set indicates one or more directions of side lobes of the second beamforming vector.

* * * * *